United States Patent
Ichikawa

(10) Patent No.: US 9,374,499 B2
(45) Date of Patent: Jun. 21, 2016

(54) INFORMATION PROCESSING APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Masanori Ichikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/557,126

(22) Filed: Dec. 1, 2014

(65) Prior Publication Data
US 2015/0156370 A1 Jun. 4, 2015

(30) Foreign Application Priority Data
Dec. 4, 2013 (JP) .................................. 2013-251388

(51) Int. Cl.
*H04N 1/32* (2006.01)
*H04N 1/00* (2006.01)

(52) U.S. Cl.
CPC ....... *H04N 1/32539* (2013.01); *H04N 1/00344* (2013.01); *H04N 1/00408* (2013.01); *H04N 1/00477* (2013.01); *H04N 1/00954* (2013.01); *H04N 1/32101* (2013.01); *H04N 2201/001* (2013.01); *H04N 2201/0094* (2013.01)

(58) Field of Classification Search
CPC ... G06F 3/1204; G06F 3/1232; G06F 3/1247; G06F 3/126; G06F 3/1288; H04L 41/12; H04L 41/22; H04N 1/00244; H04N 1/00408; H04N 1/00954; H04N 1/32101; H04N 1/32539; H04N 2201/0094; H04N 1/00344; H04N 1/00477; H04N 2201/001
USPC .................................................. 358/1.1, 1.13
See application file for complete search history.

(56) References Cited

U.S. PATENT DOCUMENTS

| | | | |
|---|---|---|---|
| 2002/0030840 A1* | 3/2002 | Itaki .................... | H04N 1/00347 358/1.13 |
| 2004/0243572 A1* | 12/2004 | Muto ............................... | 707/3 |
| 2007/0024896 A1* | 2/2007 | Bounar ................. | G06F 3/1204 358/1.15 |
| 2007/0198102 A1* | 8/2007 | Umehara et al. ................. | 700/32 |

FOREIGN PATENT DOCUMENTS

JP H10-320341 A 12/1998

* cited by examiner

*Primary Examiner* — Iriana Cruz
(74) *Attorney, Agent, or Firm* — Canon U.S.A., Inc. IP Division

(57) ABSTRACT

An information processing apparatus displays, in a case where a second search condition in which a condition is added to a first search condition is set with a data processing apparatus which satisfies the first search condition being displayed on the map, a data processing apparatus which satisfies the second search condition and a data processing apparatus which satisfies the first search condition and does not satisfy the second search condition on the map in a distinguishable manner.

12 Claims, 17 Drawing Sheets

FIG. 3
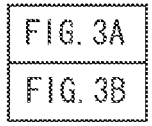
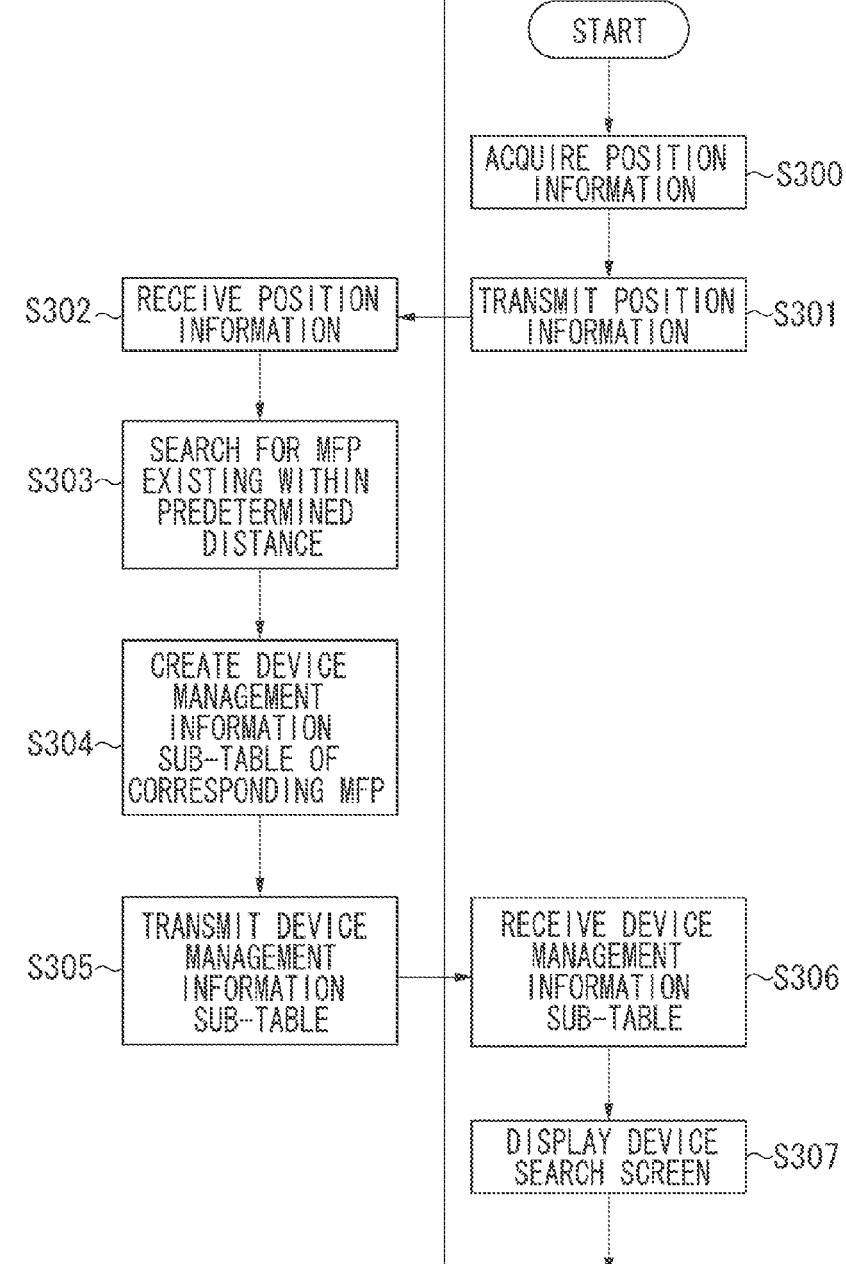

FIG. 4A

| CLIENT TERMINAL POSITION INFORMATION | | |
|---|---|---|
| LATITUDE | LONGITUDE | ALTITUDE (FLOOR NUMBER) |
| X0 | Y0 | Z0 |

FIG. 4B

DEVICE MANAGEMENT INFORMATION TABLE

| DEVICE NAME | IP ADDRESS | POSITION INFORMATION | | | FUNCTION INFORMATION | | | |
|---|---|---|---|---|---|---|---|---|
| | | LATITUDE | LONGITUDE | ALTITUDE (FLOOR NUMBER) | COLOR | STAPLER | MARK PRINTING | |
| MFP103 | nnn.nnn.nnn.nnn | X1 | Y1 | Z1 | DISABLED | ENABLED | DISABLED | ... |
| MFP104 | nnn.nnn.nnn.nnn | X2 | Y2 | Z2 | ENABLED | DISABLED | DISABLED | ... |
| MFP105 | nnn.nnn.nnn.nnn | X3 | Y3 | Z3 | ENABLED | ENABLED | DISABLED | ... |
| MFP106 | nnn.nnn.nnn.nnn | X4 | Y4 | Z4 | ENABLED | ENABLED | ENABLED | ... |
| MFP107 | nnn.nnn.nnn.nnn | X5 | Y5 | Z5 | ENABLED | ENABLED | ENABLED | ... |
| MFP108 | nnn.nnn.nnn.nnn | X6 | Y6 | Z6 | DISABLED | DISABLED | DISABLED | ... |
| ... | ... | ... | ... | ... | ... | ... | ... | ... |

FIG. 4C

DEVICE MANAGEMENT INFORMATION SUB-TABLE

| DEVICE NAME | IP ADDRESS | POSITION INFORMATION | | | DISTANCE INFORMATION | FUNCTION INFORMATION | | | |
| --- | --- | --- | --- | --- | --- | --- | --- | --- | --- |
| | | LATITUDE | LONGITUDE | ALTITUDE (FLOOR NUMBER) | | COLOR | STAPLER | MARK PRINTING | |
| MFP103 | nnn.nnn.nnn.nnn | X1 | Y1 | Z1 | D1 | DISABLED | ENABLED | DISABLED | ... |
| MFP104 | nnn.nnn.nnn.nnn | X2 | Y2 | Z2 | D2 | ENABLED | DISABLED | DISABLED | ... |
| MFP105 | nnn.nnn.nnn.nnn | X3 | Y3 | Z3 | D3 | ENABLED | ENABLED | DISABLED | ... |
| MFP106 | nnn.nnn.nnn.nnn | X4 | Y4 | Z4 | D4 | ENABLED | ENABLED | ENABLED | ... |
| MFP107 | nnn.nnn.nnn.nnn | X5 | Y5 | Z5 | D5 | ENABLED | ENABLED | ENABLED | ... |

FIG. 4D

DEVICE CANDIDATE TABLE

| DEVICE NAME | POSITION INFORMATION | | | DISTANCE INFORMATION | FUNCTION INFORMATION | | | |
|---|---|---|---|---|---|---|---|---|
| | LATITUDE | LONGITUDE | ALTITUDE (FLOOR NUMBER) | | COLOR | STAPLER | MARK PRINTING | |
| MFP104 | X2 | Y2 | Z2 | D2 | ENABLED | DISABLED | DISABLED | ... |
| MFP105 | X3 | Y3 | Z3 | D3 | ENABLED | ENABLED | DISABLED | ... |
| MFP106 | X4 | Y4 | Z4 | D4 | ENABLED | ENABLED | ENABLED | ... |
| MFP107 | X5 | Y5 | Z5 | D5 | ENABLED | ENABLED | ENABLED | ... |

FIG. 4E

DEVICE CANDIDATE TABLE

| DEVICE NAME | POSITION INFORMATION ||| DISTANCE INFORMATION | FUNCTION INFORMATION |||
| | LATITUDE | LONGITUDE | ALTITUDE (FLOOR NUMBER) | | COLOR | STAPLER | MARK PRINTING | ... |
|---|---|---|---|---|---|---|---|---|
| MFP105 | X3 | Y3 | Z3 | D3 | ENABLED | ENABLED | DISABLED | ... |
| MFP106 | X4 | Y4 | Z4 | D4 | ENABLED | ENABLED | ENABLED | ... |
| MFP107 | X5 | Y5 | Z5 | D5 | ENABLED | ENABLED | ENABLED | ... |

FIG. 5B

SEARCH CONDITION

■ COLOR  ☐ TWO-SIDED PRINTING

☐ STAPLER  ☐ CONFIDENTIAL PRINTING

☐ MARK PRINTING  ☐ COLLATING PRINTING

L:OFFICE BUILDING
A:HIGH SCHOOL
MFP103
F:SHOP
C:APARTMENT
MFP105
B:APARTMENT
G:SHOP
J:OFFICE BUILDING
MFP104
D:OFFICE BUILDING
H:SHOP
E:FACTORY
MFP106
K:SHOP

| RETURN | HOME | NEXT |

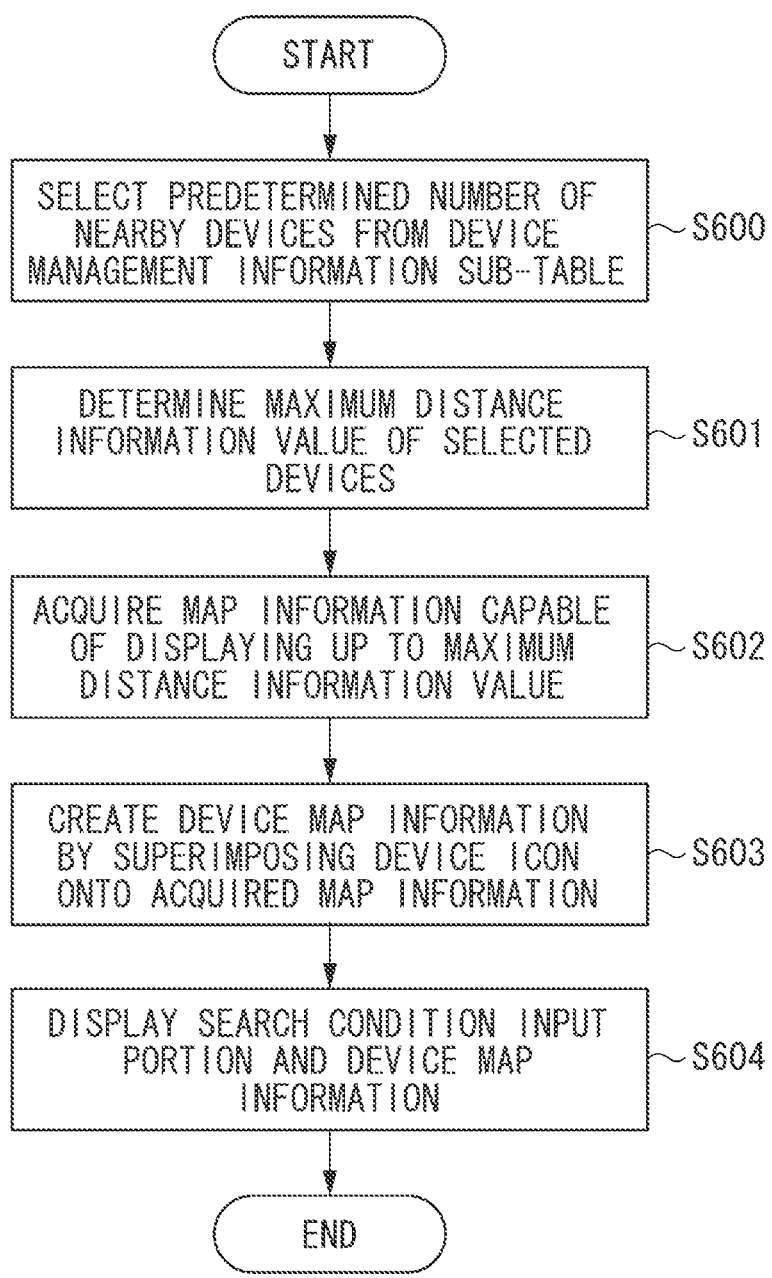

INFORMATION PROCESSING APPARATUS, METHOD FOR CONTROLLING INFORMATION PROCESSING APPARATUS, AND STORAGE MEDIUM

BACKGROUND OF THE INVENTION

1. Field of the Invention

The present invention relates to a method for displaying a search result of a data processing apparatus on a map.

2. Description of the Related Art

Conventionally, when a user operates a client terminal to execute printing through a multifunction printer (MFP), the user has been required to use a driver uniquely laid open for each MFP.

On the other hand, in recent years, in order to improve the convenience of the user, the provision of integrated drivers has been started by integrating drivers having been unique to respective MFPs, so that the user has become able to execute printing through various MFPs by using the integrated driver.

In the integrated driver, for example, a list of MFPs that are available to the user and a print setting screen common to the MFPs are displayed. The user can execute printing through a desired MFP by selecting the desired MFP and specifying the print setting to be used.

Further, because the integrated driver enables the user to use various MFPs, as described above, the integrated driver is provided with a search function for searching for the MFP that includes a desired function. Through the MFP search function, in a case where the user desires to use a color printing function, for example, the user sets "color" as a search condition so that a list of MFPs including the color printing function is displayed on a screen of the integrated driver. Further, installation sites of the respective MFPs are also displayed in the list of MFPs, so that the user can select and use an MFP placed at a desired installation site.

Further, in order to cause a user to intuitively recognize the installation site of the MFP, Japanese Patent Application Laid-Open No. 10-320341 discusses a technique for displaying a screen in which icons of input-output devices such as the MFP are arranged on a layout (map) image along with the MFP search function. In this prior art, the input-output devices arranged on the layout (map) image can be switched by setting, as a condition, a function type such as a printer, a facsimile, and a scanner.

Herein, in a case where printing is executed while on the go, it is assumed that the user executes printing by using an MFP installed in a convenience store or the like. However, the MFP including all of the desired functions may not exist in a vicinity of the user. For example, if the user desires to use a color printing function and a stapling (stapler) function, in some cases, an MFP (MFP 1) supporting the color printing function exists in a vicinity of the user, but an MFP (MFP 2) supporting both the color printing function and the stapling function may exist in a place in the distance. In such cases, if the user sets "color" and "stapler" as the search conditions, only the MFP 2 distant from the user is displayed while the MFP 1 existing in the vicinity is not displayed. However, in such cases, it may be more efficient if the user only executes color printing through the MFP 1 and manually staples the documents rather than going to the installation site of the MFP 2 to execute printing. Accordingly, the user can execute efficient printing by searching for the MFP by initially setting "color" as a condition and subsequently searching for the MFP by additionally setting "stapler" as a condition if necessary, and then executing printing through the MFP 1 only if the user finds out that the MFP 2 exists in the distance.

However, in a case where the above-described prior art is employed, although both the MFP 1 and the MFP 2 are displayed in the map when "color" is set as the search condition, only the MFP 2 is displayed thereon if "stapler" is additionally set thereto. Therefore, in order to confirm the installation site of the MFP 1 again, the user needs to search for the MFP by setting "color" as the condition again.

SUMMARY OF THE INVENTION

The present invention is directed to an information processing apparatus capable of searching for a desired data processing apparatus by effectively utilizing a previously acquired search result.

According to an aspect of the present invention, an information processing apparatus includes a setting unit configured to set a search condition of a data processing apparatus, a first display unit configured to display, in a case where a first search condition is set by the setting unit, a data processing apparatus which satisfies the first search condition on a map, and a second display unit configured to display, in a case where a second search condition in which a condition is added to the first search condition is set by the setting unit with the data processing apparatus which satisfies the first search condition being displayed on the map by the first display unit, a data processing apparatus which satisfies the second search condition and a data processing apparatus which satisfies the first search condition and does not satisfy the second search condition on the map in a distinguishable manner.

Further features of the present invention will become apparent from the following description of exemplary embodiments with reference to the attached drawings.

BRIEF DESCRIPTION OF THE DRAWINGS

FIG. 4A is a table illustrating an example of current position information of the client terminal according to the present exemplary embodiment. FIG. 4B illustrates an example of a device management information table according to the present exemplary embodiment. FIG. 4C illustrates an example of a device management information sub-table according to the present exemplary embodiment. FIGS. 4D and 4E illustrate examples of a device candidate table according to the present exemplary embodiment.

FIGS. 5A to 5D illustrate examples of device search screens displayed for a user, according to the present exemplary embodiment.

FIG. 6 is a flowchart illustrating a method for creating a device search screen according to the present exemplary embodiment.

DESCRIPTION OF THE EMBODIMENTS

Various exemplary embodiments, features, and aspects of the invention will be described in detail below with reference to the drawings.

<General Configuration of System>

Figure 1:
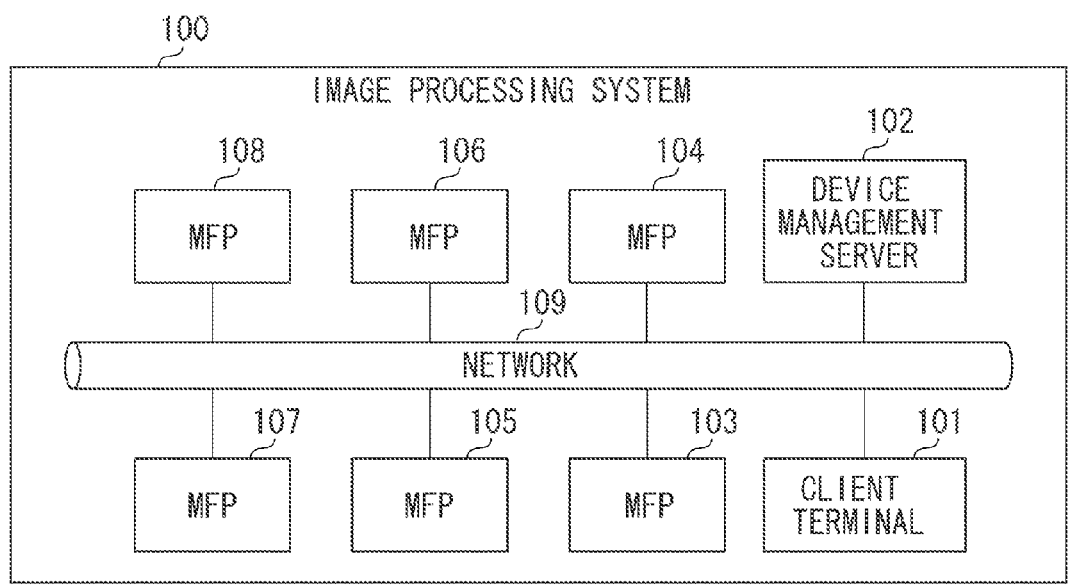
FIG. 1 is an overall block diagram of an image processing system according to a first exemplary embodiment of the present invention.

FIG. 1 is an overall block diagram of an image processing system 100 according to a first exemplary embodiment. A client terminal 101, a device management server 102, and a plurality of MFPs 103 to 108 are communicably connected to each other via a network 109. A method for connecting the respective apparatuses to the network 109 can be realized by a wired local area network (LAN) or a wireless LAN.

The client terminal 101 is an information processing apparatus such as a notebook personal computer (PC), a tablet PC, or a smartphone, which will be described below in detail.

The device management server 102 manages various types of information of each MFP, including communication information such as an internet protocol (IP) address, position information, and function information, so as to transmit the information of the MFP to the client terminal 101 in response to a request from the client terminal 101. The details thereof will be described below.

The MFPs 103 to 108 are multifunction printers connectable to the network 109. The MFPs 103 to 108 receive print data transmitted from the client terminal 101 and execute printing on sheets of paper. The details thereof will be described below. In the present exemplary embodiment, the MFP is described as an example of a data processing apparatus. However, the data processing apparatus may be a single function printer (SFP) which only includes a printing function.

<Configuration of Client Terminal>

Figure 2A:
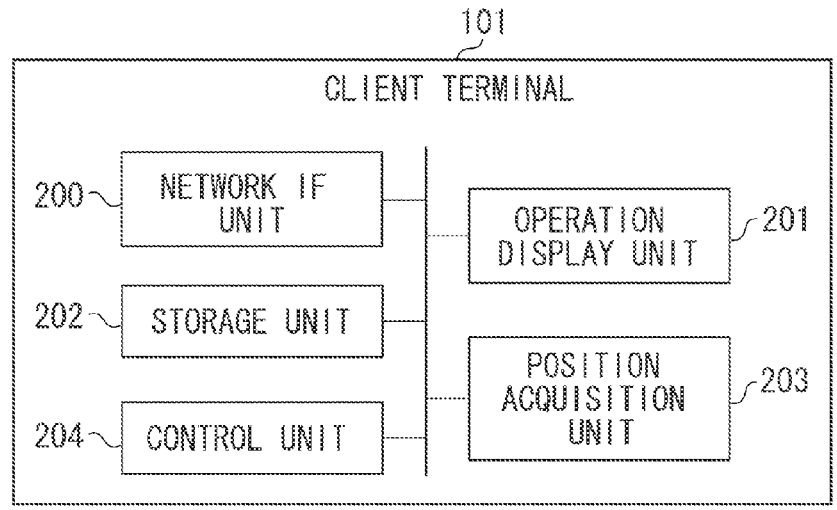
FIG. 2A is a block diagram of a client terminal according to the present exemplary embodiment.

FIG. 2A is a detailed block diagram of the client terminal 101 according to the present exemplary embodiment.

A network interface (IF) unit 200 is an interface which supports a wireless LAN conforming to the Institute of Electrical and Electronics Engineers (IEEE) 802.11g, the IEEE 802.11b, or the IEEE 802.11a. The network IF unit 200 exchanges data with an external device via the wireless LAN. The network IF unit 200 may be configured as an interface of a wired LAN.

An operation display unit 201 is a device such as a touch panel provided with a display function as well as an operation function. The operation display unit 201 functions as a user interface of the client terminal 101. The operation display unit 201 may include a liquid crystal display and hard keys.

A storage unit 202 is a storage device such as a hard disk or a flash memory for storing image data and print data. Further, the storage unit 202 also functions as an auxiliary storage device for a control unit 204 described below, and includes a storage region for the work of a program.

A position acquisition unit 203 has a function for detecting a current position of the client terminal 101. The position acquisition unit 203 includes, for example, an antenna for receiving a global positioning system (GPS) signal and a GPS signal processing unit for calculating position information from the received GPS signal. The position acquisition unit 203 may further include an indoor messaging system (IMES) signal processing unit which calculates position information from an IMES signal received through the antenna. The position acquisition unit 203 may be realized by a wireless fidelity (Wi-Fi) position information processing unit which calculates current position information from the radio field intensity of the wireless LAN received via the network IF unit 200. In the present exemplary embodiment, details of the above-described position information acquisition methods will not be described because the methods thereof are publicly known.

The control unit 204 is a central processing unit (CPU) for controlling the client terminal 101.

<Configuration of Device Management Server>

Figure 2B:
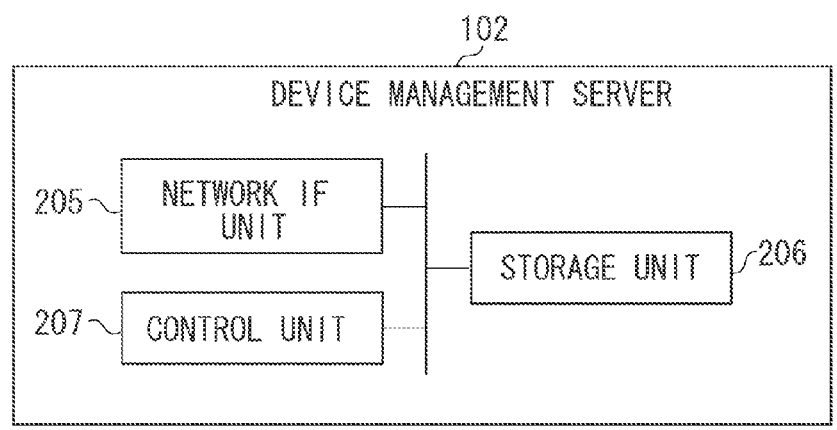
FIG. 2B is a block diagram of a device management server according to the present exemplary embodiment.

FIG. 2B is a detailed block diagram of the device management server 102 according to the present exemplary embodiment.

A network IF unit 205 is an interface which supports a wired LAN such as the Gigabit Ethernet®. The network IF unit 205 exchanges data with an external device via the wired LAN.

A storage unit 206 is a storage device such as a hard disk or a solid state drive (SSD) for storing various types of information of each MFP. Further, the storage unit 206 also functions as an auxiliary storage device for a control unit 207 described below, and includes a storage region for the work of a program.

The control unit 207 is a CPU for controlling the device management server 102.

<Configuration of MFP>

Figure 2C:
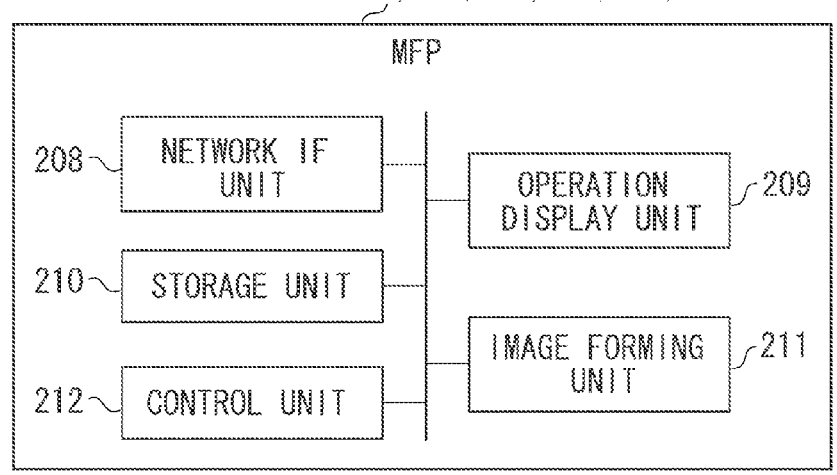
FIG. 2C is a block diagram of each of MFPs according to the present exemplary embodiment.

FIG. 2C is a detailed block diagram of each of the MFPs 103 to 108 according to the present exemplary embodiment.

A network IF unit 208 is an interface which supports a wired LAN such as the Gigabit Ethernet®. The network IF unit 208 exchanges data with an external device via the wired LAN. The network IF unit 208 may be configured as an interface of a wireless LAN.

An operation display unit 209 is a device such as a touch panel provided with a display function as well as an operation function. The operation display unit 209 functions as a user interface of each of the MFPs 103 to 108. The operation display unit 209 may include a liquid crystal display and hard keys.

A storage unit 210 is a storage device such as a hard disk or an SSD for storing print data. Further, the storage unit 210 also functions as an auxiliary storage device for a control unit 212 described below, and includes a storage region for the work of a program.

An image forming unit 211 includes devices for forming, on a sheet of paper, an image based on print data. For a laser printer method, for example, the image forming unit 211 includes a sheet conveyance device, a photosensitive drum, a fixing unit, and the like.

The control unit 212 is a CPU for controlling each of the MFPs 103 to 108.

<Processing Flows of Print Setting and Print Data Input According to Present Exemplary Embodiment>

Figure 3B:
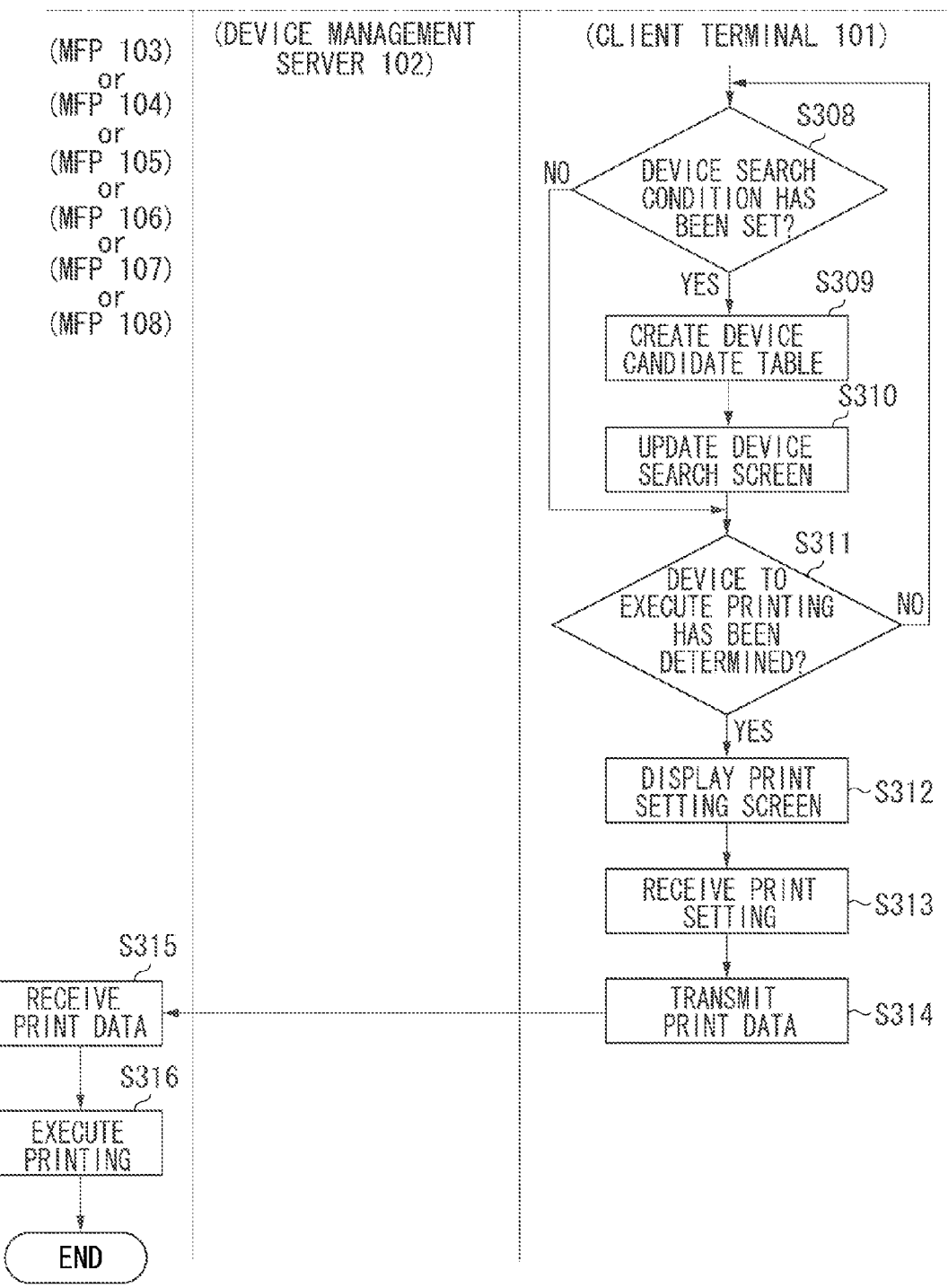
FIG. 3, which is composed of FIGS. 3A and 3B, is a flowchart illustrating print setting processing according to the present exemplary embodiment.

FIG. 3 is a flowchart illustrating processing flows of print setting and print data input according to the present exemplary embodiment. The respective types of processing are executed by the client terminal 101, the device management server 102, and any of the MFPs 103 to 108, while an MFP printing application operating on the client terminal 101 plays a central role thereof. The MFP printing application according to the present exemplary embodiment is referred to as, for example, an integrated driver or an integrated user interface, which integrally executes the print setting operation on various MFPs and integrally issues print data thereto. However, the MFP printing application is not limited to the above.

General processing flows from activating this application to executing printing through the application will be described below. More specifically, the processing will be executed in the order of activating the application, selecting print documents, searching for and determining a printing device (MFP or SFP), determining print settings, issuing print data, and executing printing through the printing device. This processing flow will be described below in detail. In the present exemplary embodiment, however, processing flow after the MFP printing application is activated on the client terminal 101 and a user has selected the documents to be printed will be described. In other words, description will be given of the processing flow from the point where a device search screen for searching for and determining the printing device is displayed.

First, in step S300, the position acquisition unit 203 of the client terminal 101 acquires position information of the client terminal 101.

In step S301, the control unit 204 of the client terminal 101 transmits the position information acquired by the position acquisition unit 203 to the device management server 102. FIG. 4A is a table illustrating an example of the transmitted current position information of the client terminal 101. The position information includes a latitude, a longitude, and an altitude or a floor number.

In step S302, the control unit 207 of the device management server 102 receives the position information of the client terminal 101 and stores the received position information in the storage unit 206.

In step S303, the control unit 207 of the device management server 102 searches for an MFP that exists in an area within a predetermined distance from the client terminal 101. An MFP management information table (a device management information table) illustrated in FIG. 4B is created in advance and stored in the storage unit 206, so that the control unit 207 of the device management server 102 can refer to the position information of each MFP. The control unit 207 of the device management server 102 calculates a distance between the client terminal 101 and each MFP from the received position information of the client terminal 101 and the position information of each MFP stored in the MFP management information table. In this calculation processing, a distance between two points is calculated from coordinate information such as a latitude and a longitude, included in each position information. In a case where altitude information can also be used, for example, the calculation of the distance may be executed by limiting the MFPs to those existing on the same floor number. Based on the calculated distance, the control unit 207 of the device management server 102 extracts the MFP which exists in an area within the predetermined distance from the client terminal 101. In addition, the predetermined distance as a threshold value may be collectively set by the device management server 102, or may be individually set for each client terminal.

In step S304, the control unit 207 of the device management server 102 creates a device management information sub-table in which respective types of information of each MFP extracted in step S303 are listed. FIG. 4C illustrates an example of the device management information sub-table. The device management information sub-table includes various types of information of each device, such as a device name, an IP address, position information, information of a distance between the client terminal 101 and each MFP calculated in step S303, and function information of each MFP. The function information is the information of a printing-related function included in the MFP, which is used as the print conditions described below. For example, the function information may indicate whether the device is a color printer (whether the device includes a color printing function or only includes a monochromatic printing function), whether the device can execute stapling processing (presence or absence of stapling function), and whether the device can print a mark such as a copy-prohibited mark on a document (presence or absence of a stamping function). In the present exemplary embodiment, the devices are listed on the device management information sub-table in the ascending order of the distance information value (i.e., in the order starting from the device with the smallest distance value) from the top. Accordingly, among the values of distance information pieces D1 to D5, the distance information D1 has the smallest value while the values increasing in the order of D2, D3, D4, and D5. Further, in the present exemplary embodiment, the distance information is included in the device management information sub-table. However, the distance information may be calculated on the client terminal 101 side based on its own position information and the position information of the MFP.

In step S305, the control unit 207 of the device management server 102 transmits the created device management information sub-table to the client terminal 101.

In step S306, the control unit 204 of the client terminal 101 receives the device management information sub-table transmitted from the device management server 102 via the network IF unit 200. The received device management information sub-table is stored in the storage unit 202.

Figure 5A:
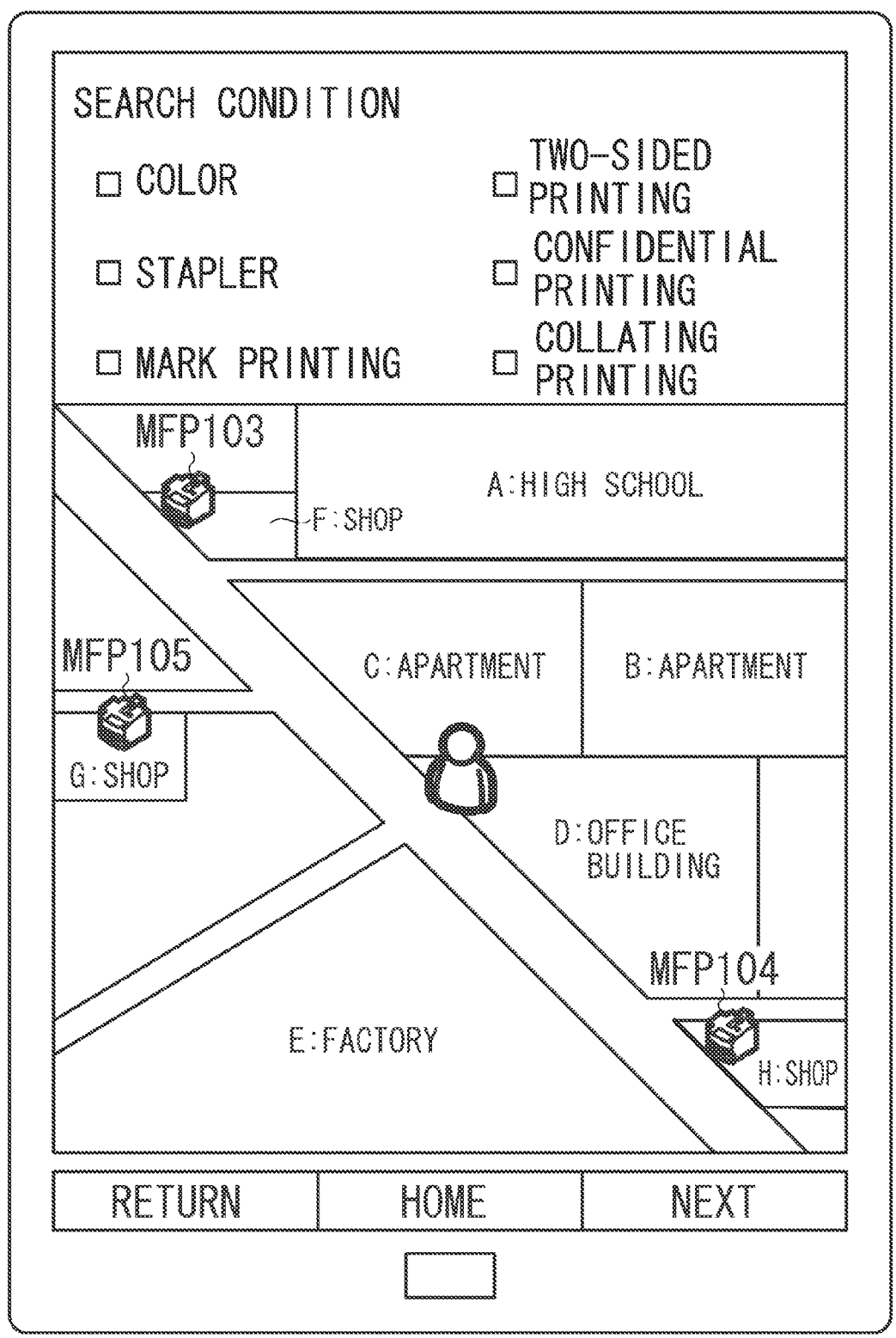

In step S307, the control unit 204 of the client terminal 101 displays a device search screen as illustrated in FIG. 5A on the operation display unit 201. Herein, the device search screen will be described in detail.

The device search screen includes a search condition input portion and device map information that includes a device icon. The search condition input portion is provided for enabling the user to select (input) a function the user desires to use. Thus, the user selects (inputs) a search condition of the device the user desires to use through the search condition input portion. The device map information is information of a map indicating the current position information of the client terminal 101 at the center thereof, and the devices which satisfy the search condition set in the search condition input portion are indicated on this map by superimposing respective device icons onto positions corresponding to the actual installation sites. A predetermined number of device icons are displayed while a scale of the map is determined in coordination therewith. This predetermined number is preset by the user. For example, in the present exemplary embodiment, three device icons are displayed thereon. If a predetermined number of devices which satisfy the search conditions exist in proximity to the current position of the client terminal 101, for example, a scale of the map becomes larger whereas a scale thereof becomes smaller if a predetermined number of devices exist in the distance from the current position of the client terminal 101. The device search screen in FIG. 5A is created based on the device management information sub-table in FIG. 4C, so that the MFPs 103, 104, and 105 are displayed thereon.

Herein, a method for creating the device search screen in step S307 as described above will be described with reference to a flowchart illustrated in FIG. 6.

First, in step S600, the control unit 204 of the client terminal 101 selects a predetermined number (three in the present exemplary embodiment, as described above) of pieces of device information from the device management information sub-table acquired in step S306 in the ascending order of the distance from the client terminal 101. In the present exemplary embodiment, the devices are sorted in the ascending order of the distance from the position of the client terminal 101, from the top of the device management information sub-table. Thus, the control unit 204 of the client terminal 101 makes each device information referable by selecting the first to third devices from the top of the device management information sub-table. Further, in a case where the devices listed in the device management information sub-table are not sorted in the ascending order of the distance, the control unit 204 of the client terminal 101 selects three devices each having the smallest, the second-smallest or the third-smallest distance information value by referring to the distance information. Thus, for example, the MFPs 103, 104, and 105 are selected from the device management information sub-table illustrated in FIG. 4C.

Next, in step S601, the control unit 204 of the client terminal 101 determines the maximum distance information value by referring to the three pieces of distance information selected in step S600. For example, as described above, because the MFPs 103, 104, and 105 are selected from the device management information sub-table in FIG. 4C in step S600, the control unit 204 of the client terminal 101 determines the maximum value from among the corresponding distance information pieces D1, D2, and D3. In the present exemplary embodiment, because the distance information D1 has the smallest value while the values increasing in the order of D2, D3, D4, and D5, as described above, the distance information D3 is determined to have the maximum value.

In step S602, the control unit 204 of the client terminal 101 acquires map information capable of displaying up to the maximum distance information value determined in step S601. The map information is acquired from a server (not illustrated) via the network IF unit 200. The map information laid open for free can be used therefor, and detailed description thereof will be omitted because the acquisition method of the map information is publicly known.

Next, in step S603, the control unit 204 of the client terminal 101 creates the device map information in which device icons of the devices selected in step S600 are arranged by superimposing the respective device icons onto the map information acquired in step S602. The device map information is a map information in which the device icons are further arranged on a general map information. Arrangement of the device icons is determined based on the latitude and the longitude included in the map information and the position information (i.e., the latitude and the longitude) of each of the devices.

In step S604, the control unit 204 of the client terminal 101 displays the search condition input portion including the items of search conditions prepared in advance and the device map information created in step S603 on the operation display unit 201 so as to be fitted into a single screen. Through the above-described operations, the device search screen is created.

Referring back to FIG. 3, in step S308, the control unit 204 of the client terminal 101 then determines whether the user has set the device search condition on the device search screen. In other words, the control unit 204 of the client terminal 101 determines whether the user has enabled the checkboxes of respective functions in the search condition input portion of the above-described device search screen. For example, the control unit 204 of the client terminal 101 determines whether the user has pressed any of the checkboxes. If the control unit 204 of the client terminal 101 determines that the device search condition has been set (YES in step S308), the processing proceeds to step S309. If the control unit 204 of the client terminal 101 determines that the device search condition has not been set (NO in step S308), the processing proceeds to step S311.

In step S309, the control unit 204 of the client terminal 101 creates a device candidate table. The device candidate table is a table illustrated in FIG. 4D or 4E for example, in which the devices that satisfy the device search conditions specified by the user are extracted from the device management information sub-table. The device candidate table illustrated in FIG. 4D is created when "color" is set as the search condition, and thus only the devices capable of executing color printing are listed therein. Further, the device candidate table illustrated in FIG. 4E is created when "color" and "stapler" are set as the search conditions, and thus only the devices capable of executing both the color printing function and the stapling function are listed therein.

In step S310, the control unit 204 of the client terminal 101 updates the device search screen based on the device candidate table. Processing for updating the device search screen will be described below. FIG. 5B illustrates an example of the screen when "color" is set as the search condition. This screen is created based on the device candidate table illustrated in FIG. 4D. The configuration of the screen is similar to that has been described above in step S307. Herein, because the user has set "color" as the device search condition, the device search screen is updated to display device map information which includes only the devices having the color printing function. Herein, among the device icons displayed on the previous device search screen (the screen illustrated in FIG. 5A), the device that cannot execute color printing is displayed as a history in a format distinguishable from the devices that satisfy the current device search condition. In FIG. 5B, a black-filled device icon (MFP 103) corresponds to the device as a history. Further, in the present exemplary embodiment, this device icon is displayed in the same size as that of the other device icons. However, the color and the size of the device icon are not limited to the above. Further, in FIG. 5A, the devices serving as display targets of the device map information are the MFPs 103, 104, and 105, and the maximum distance information value is the value of the distance information D3. However, in FIG. 5B, because "color" is set as the search condition, the devices serving as the display targets of the device map information are the MFPs 104, 105, and 106, and the maximum distance information value is the value of the distance information D4. Accordingly, a scale of the map information included in the device map information in FIG. 5B is smaller than that in FIG. 5A.

Figure 5C:
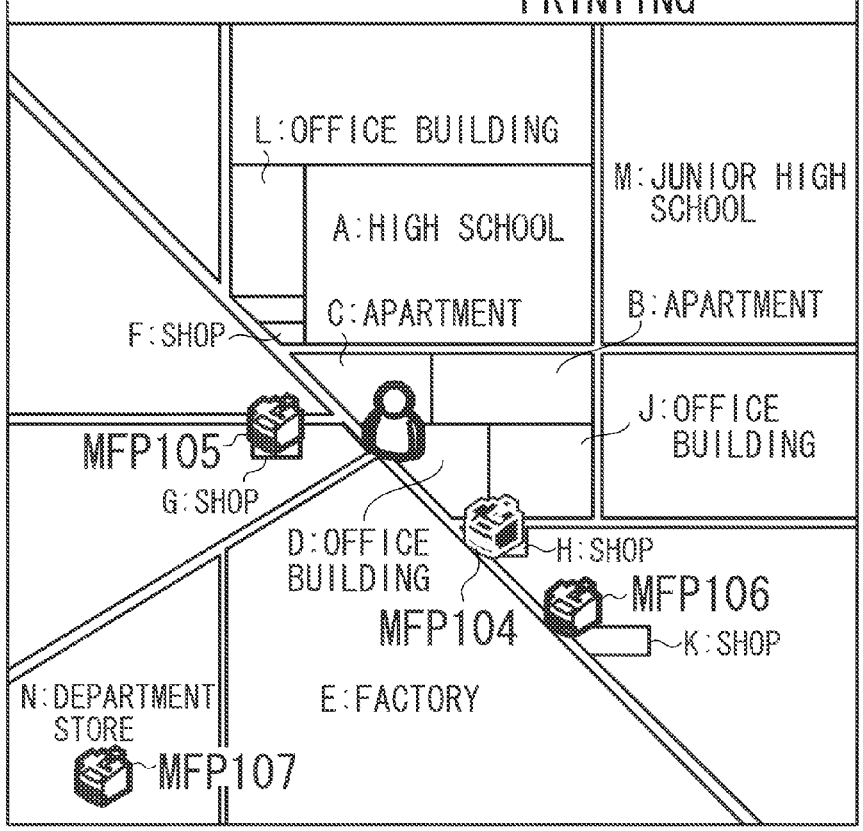

Furthermore, in a case where the user also desires to use a stapling function, the user presses and enables the checkbox of "stapler" on the screen in FIG. 5B. If the checkboxes of "color" and "stapler" are enabled, only the devices capable of executing printing by using two functions, namely, the color function and the stapling function, are displayed in the device map information as illustrated in FIG. 5C. The device map information in FIG. 5C is created based on the device candidate table illustrated in FIG. 4E. At the same time, as described above, among the device icons displayed on the previous device search screen (the screen illustrated in FIG. 5B), the device which does not include the two functions, namely, the color function and the stapling function, is displayed as a history in a format distinguishable from the devices that satisfy the current device search condition. Further, in FIG. 5B, the devices serving as the display targets of the device map information are the MFPs 104, 105, and 106, and the maximum distance information value is the value of the distance information D4. However, in FIG. 5C, because "stapler" is further added to the search conditions, the devices serving as the display targets are the MFPs 105, 106, and 107, and the maximum distance information value is the value of the distance information D5. Accordingly, a scale of the map information included in the device map information in FIG. 5C is smaller than that in FIG. 5B.

Figure 7:
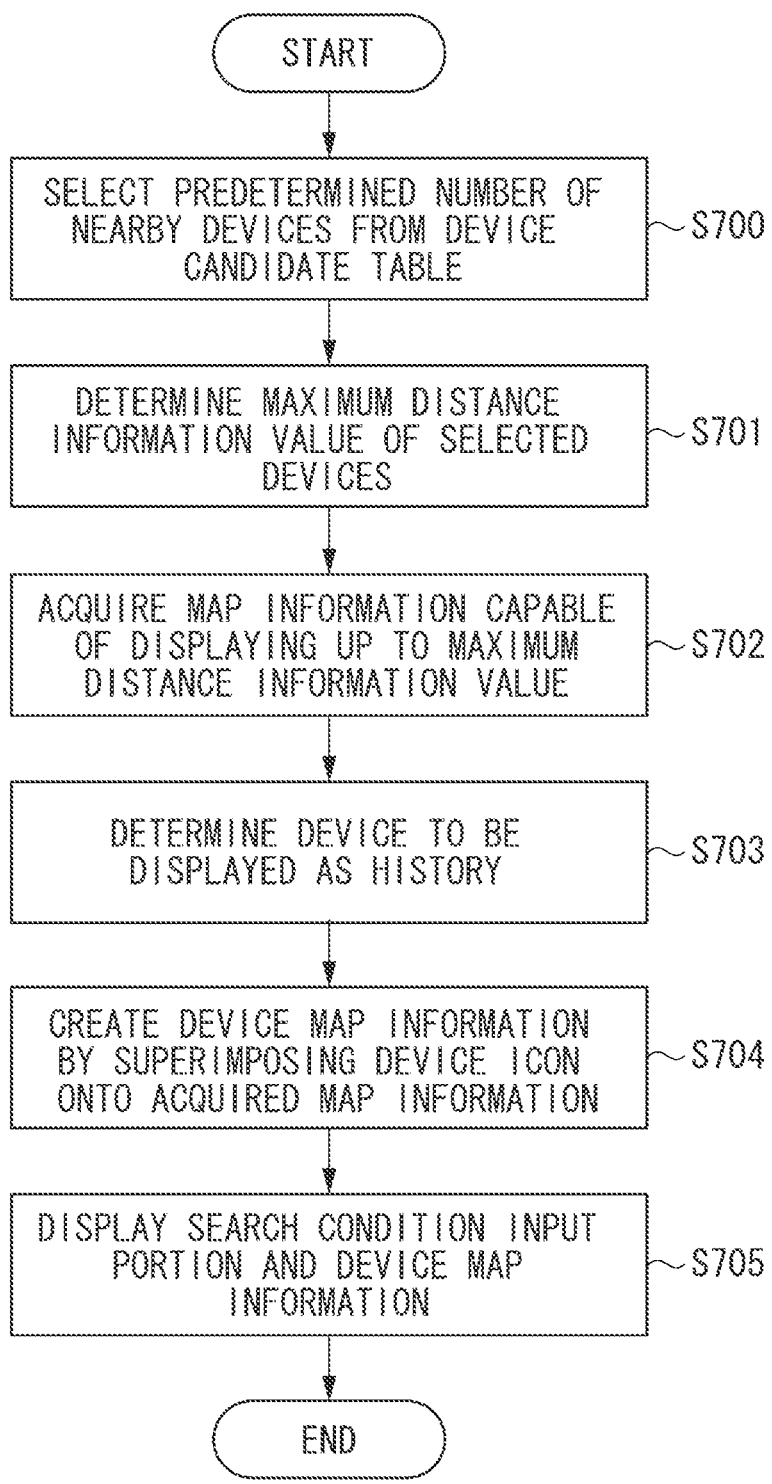
FIG. 7 is a flowchart illustrating a method for updating the device search screen according to the present exemplary embodiment.

Herein, processing for updating the device search screen will be described with reference to a flowchart illustrated in FIG. 7. First, in step S700, the control unit 204 of the client terminal 101 selects a predetermined number (three in the present exemplary embodiment, as described above) of pieces of device information from the device candidate table created in step S309 in the ascending order of the distance from the client terminal 101. This processing is basically similar to that described in step S600, except that the device candidate table is used instead of the device management information sub-table. The device management information sub-table includes all of the devices capable of executing the basic printing processing regardless of presence or absence of specific functions, whereas the device candidate table includes only the devices having the functions the user has set as the device search condition. For example, as described above, the device candidate table illustrated in FIG. 4D is created when "color" is set as the search condition, so that the devices listed in this device candidate table include the color printing function. In addition, the device candidate table according to the present exemplary embodiment is created by removing the device which does not satisfy the condition set by the user from the device management information sub-table. Therefore, similarly to the device management information sub-table, the devices are sorted in the ascending order of the distance from the client terminal 101. Accordingly, the control unit 204 of the client terminal 101 can select the predetermined number (three in the present exemplary embodiment) of devices by selecting the first to third devices from the top of the device candidate table. For example, in the device candidate table in FIG. 4D, the MFPs 104, 105, and 106 are selected. In addition, a format of the device candidate table is not limited to the above.

Next, in step S701, the control unit 204 of the client terminal 101 determines the maximum distance information value by referring to the three pieces of device information selected in step S700. This processing is similar to that described in step S601, and thus detailed description thereof will be omitted. In addition, in the example of the device candidate table in FIG. 4D, the maximum value thereof is the value of the device information D4.

In step S702, the control unit 204 of the client terminal 101 acquires map information capable of displaying up to the maximum distance information value determined in step S701. Because the processing is similar to that in step S602, detailed description thereof will be omitted.

Next, in step S703, the control unit 204 of the client terminal 101 determines the device that is to be displayed in the device map information as a history. The device to be displayed as a history refers to a device which does not satisfy the device search condition newly set by the user, among the devices whose device icons have been arranged on the previous device map information. The device icon of this device is arranged and displayed in the device map information as a history. For example, in FIG. 5A, the MFPs 103, 104, and 105 are selected and displayed in the device map information based on the device management information sub-table in FIG. 4C, as described above. However, in FIG. 5B, because the MFPs 104, 105, and 106 are selected from the device candidate table in FIG. 4D, the user can recognize that the MFP 103 does not satisfy the device search condition set by the user. This MFP 103 will be a target device to be displayed as a history described in step S703.

Next, in step S704, the control unit 204 of the client terminal 101 creates device map information in which device icons of the devices selected in step S700 are arranged by superimposing the respective device icons onto the map information acquired in step S702. Further, in step S704, the device icon of the device that is determined to be displayed as a history in step S703 is arranged as a history. As described above, the device icons of the devices that satisfy the device search conditions and the device icon to be displayed as a history needs to be displayed in distinguishable formats. Thus, in the present exemplary embodiment, the device icon to be displayed as a history is displayed as a black-filled device icon. In FIG. 5B, because the MFP 103 has been determined to be displayed as a history in step S703, the MFP 103 is displayed as a black-filled device icon in the device map information.

In step S705, the control unit 204 of the client terminal 101 displays a screen in which any of the checkboxes in the search condition input portion used in step S604 is enabled, and the device map information created in step S704 on the operation display unit 201, so as to be fitted into a single screen. The enabled checkboxes correspond to the device search conditions specified by the user. Through the above operations, the device search screen is updated. Herein, the device search screen has been updated to the state illustrated in FIG. 5B from the state illustrated in FIG. 5A where no device search condition has been set. However, the update of the screen can be also realized through similar operations even in a case where the screen is updated from the state illustrated in FIG. 5B where the device search condition has been set to the state illustrated in FIG. 5C, for example.

Figure 5D:
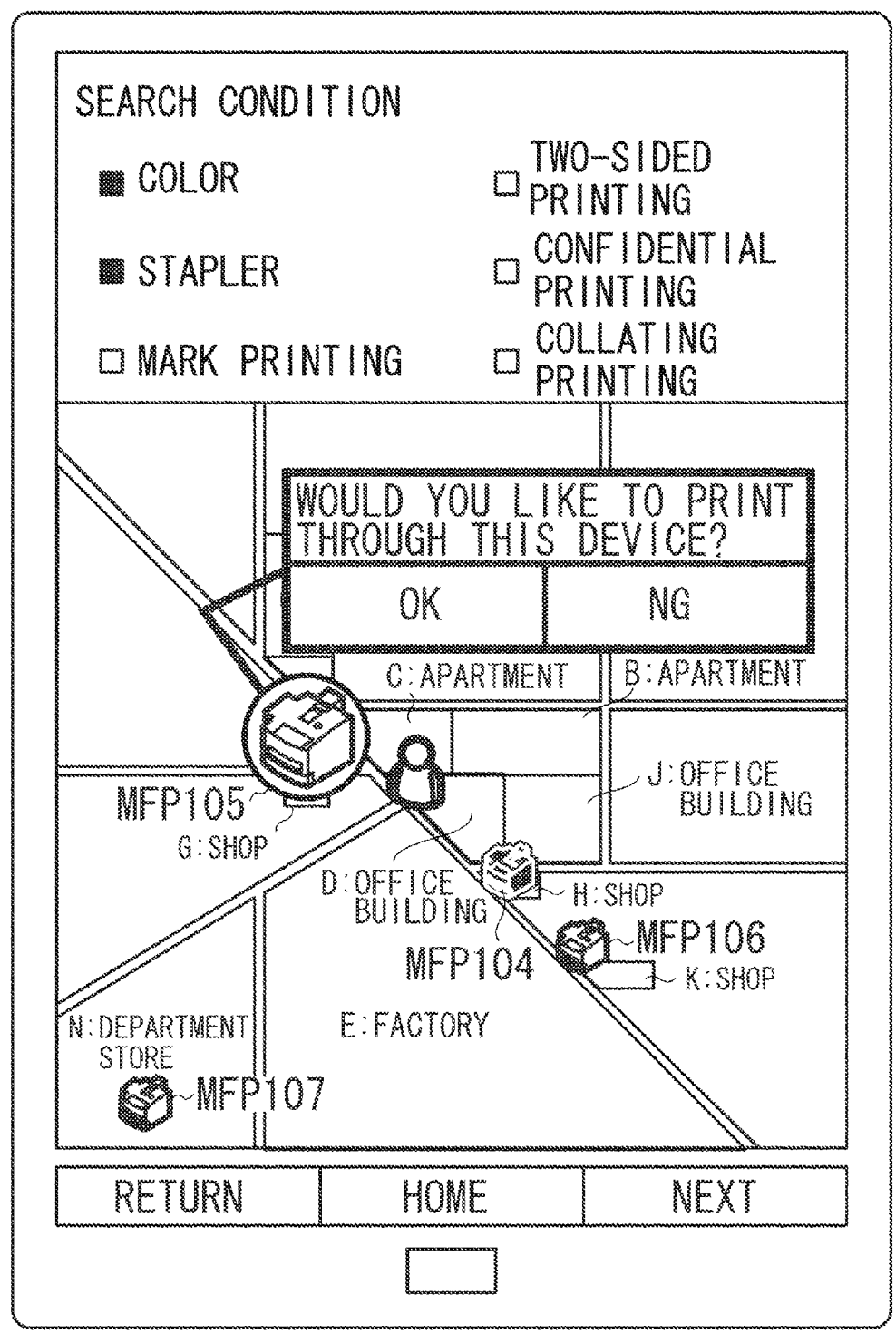

Referring back to FIG. 3, in step S311, the control unit 204 of the client terminal 101 then determines whether the device to execute printing has been determined. More specifically, for example, when the device icon is pressed, a pop-up screen is displayed as illustrated in FIG. 5D, and the control unit 204 makes the determination according to whether an OK button on the pup-up screen has been further pressed. In a case where the control unit 204 of the client terminal 101 determines that the device to execute printing is determined (YES in step S311), the processing proceeds to step S312. On the other hand, in a case where the control unit 204 of the client terminal 101 determines that the device to execute printing is not determined (NO in step S311), the processing returns to step S308. In the present exemplary embodiment, in order to express the device selected by the user in an explicit manner, the device icon is displayed such that the icon is enlarged and surrounded by a circular frame. However, the expression method thereof is not limited to the above.

Figure 5E:
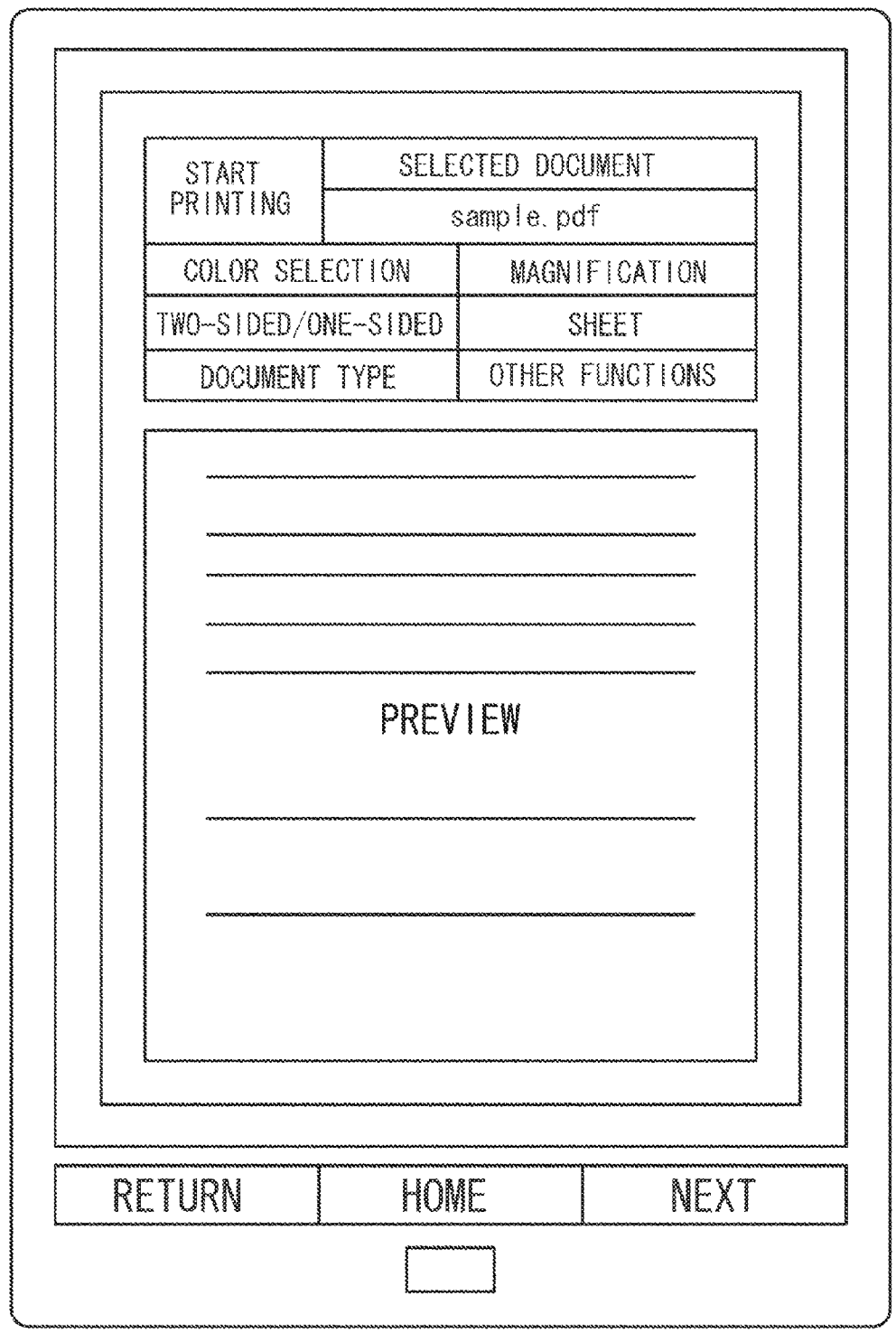
FIG. 5E illustrates an example of a print setting screen displayed for a user, according to the present exemplary embodiment.

In step S312, the control unit 204 of the client terminal 101 displays a print setting screen as illustrated in FIG. 5E on the operation display unit 201. The print setting screen includes a print start button, a name of a document to be printed, setting buttons of printing functions such as color selection and magnification, and a preview screen, so that the print setting desired by the user can be received through the screen. The above-described configuration of the print setting screen is merely an example, and thus the print setting screen is not limited to the above.

In step S313, the control unit 204 of the client terminal 101 receives the print setting desired by the user through the print setting screen in FIG. 5E displayed on the operation display unit 201. This reception of the print setting continues until the user presses the print start button. The processing proceeds to step S314 when the user presses the print start button.

In step S314, the control unit 204 of the client terminal 101 creates print data based on the set print setting, and transmits the print data to the IP address of the device determined in step S311 through the network 109. The IP address of the device can be acquired by referring to the device management information sub-table or the device candidate table.

In step S315, the control unit 212 of the device determined in step S311 receives the print data transmitted from the client terminal 101 through the network IF unit 208 and stores the print data in the storage unit 210.

Next, in step S316, the control unit 212 of the device determined in step S311 transfers the print data stored in the storage unit 210 to the image forming unit 211 to execute printing after the image forming unit 211 executes various types of image processing and layout formation according to the print setting set by the user.

As described above, in the present exemplary embodiment, the device map information in which the device icons are arranged is displayed on the device search screen together with the search condition input portion, and the history of the device search condition specified by the user is further displayed thereon. With this configuration, the user becomes able to not only intuitively recognize the position of the device to execute printing, but also intuitively recognize a change in devices displayed in the device map information when the device search condition specified by the user changes. Accordingly, in comparison to the conventional device search and device selection methods, the image processing system 100 according to the present exemplary embodiment can prompt the user to determine a device more intuitively without bothering the user.

Further, in the present exemplary embodiment, a status of the device has not been taken into consideration. However, the device map information may be created after considering whether the device is in an available state. For example, in a case where any of the devices is in an error state such as a paper jam state, or any of the devices is currently being used by another user, the control unit 204 of the client terminal 101 may be configured to create the device map information in which the device icon of such a device is not displayed. In other words, based on the status of each device, a device that cannot promptly execute printing may be excluded from the display target.

In the first exemplary embodiment, as illustrated in FIG. 5D, device determination processing has been executed when the device icon is pressed. A second exemplary embodiment will be described while changing only the processing to be executed when the user presses the device icon. Accordingly, processing executed in the present exemplary embodiment is similar to that described in the first exemplary embodiment except for the above change, and thus only the processing to be executed when the user presses the device icon will be described in detail.

Figure 8:
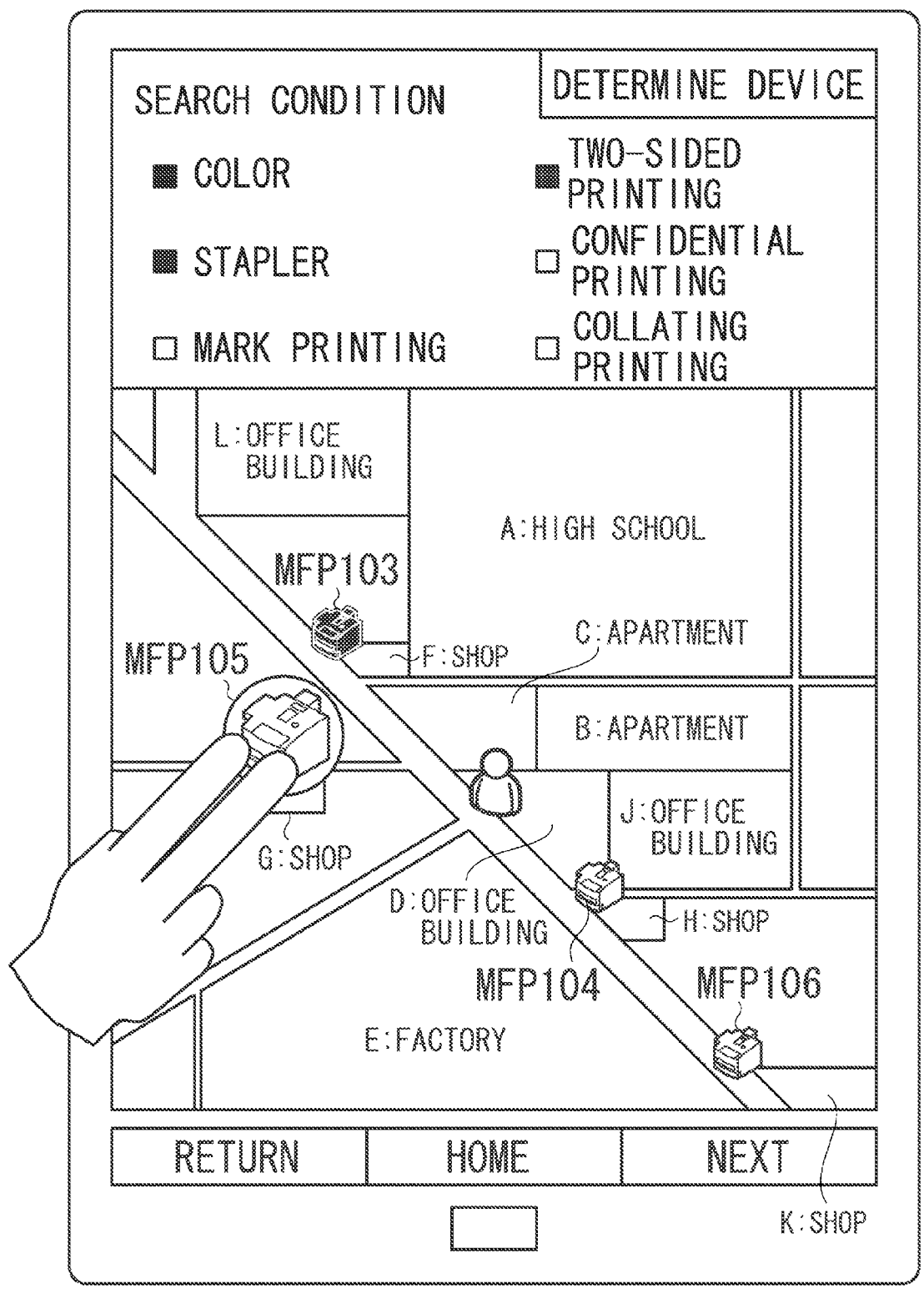
FIG. 8 illustrates an example of a device search screen displayed for a user, according to a second exemplary embodiment.

The processing that is to be executed when the device icon is pressed in the present exemplary embodiment will be described with reference to FIG. 8. The configuration of a screen illustrated in FIG. 8 is basically similar to those illustrated in FIGS. 5A, 5B, 5C, and 5D except for a device determination button that is newly disposed thereon. In the first exemplary embodiment, when the device icon is pressed, the control unit 204 of the client terminal 101 executes the device determination processing by displaying a pop-up screen as illustrated in FIG. 5D. In the second exemplary embodiment, when the control unit 204 of the client terminal 101 detects that the device icon is pressed, the control unit 204 causes the device icon to enter into a selected state and waits until the device determination button is pressed. When the device determination button is pressed, the control unit 204 of the client terminal 101 executes the device determination processing by displaying the pup-up screen.

Herein, the processing to be executed when the device icon is pressed will be described. In the present exemplary embodiment, when the control unit 204 of the client terminal 101 detects that the device icon is pressed, the control unit 204 causes the pressed device icon to enter into the selected state. For example, in FIG. 8, the device icon of the MFP 105 is enlarged and also surrounded by a circular frame in order to explicitly express that the device icon of the MFP 105 is pressed and in the selected state. However, the expression method thereof is not limited to the above.

Subsequently, the control unit 204 of the client terminal 101 acquires the function information of the device in a selected state. The control unit 204 of the client terminal 101 executes the above processing by referring to the above-described device management information sub-table or the device candidate table. In the example illustrated in FIG. 8, the MFP 105 is in the selected state, and the control unit 204 of the client terminal 101 can identify that the MFP 105 includes respective functions of "color", "stapler", and "two-sided printing (not illustrated)" by referring to the device candidate table in FIG. 4D.

Next, based on the acquired function information, the control unit 204 of the client terminal 101 enables the checkboxes corresponding to the functions included in the device, in the search condition input portion on the device search screen. As described above, the MFP 105 includes the functions of "color", "stapler", and "two-sided printing". Therefore, in the example illustrated in FIG. 8, the checkboxes respectively corresponding to "color", "stapler", and "two-sided printing" are enabled. In addition, some of the checkboxes may be already enabled in a case where the user has set the search condition in advance. Therefore, the control unit 204 of the client terminal 101 only enables the checkbox that has not been enabled.

As described above, according to the present exemplary embodiment, in a case where the device icon is pressed, from among the functions included in the device corresponding to the pressed device icon, the functions settable as the search condition are displayed in a distinguishable manner.

Displaying the functions enables the user to easily recognize what types of functions are included in the devices displayed in the device map information. Further, by searching for a device again after enabling the checkboxes relating to the functions included in the selected device, the user can identify the installation site of another device that includes the same functions as those included in the selected device, so that the convenience of the user can be improved.

Furthermore, in the present exemplary embodiment, the functions of the device are displayed by enabling the corresponding checkboxes. However, the display method is not limited to the above, and thus the functions thereof may be simply displayed by text such as a pup-up message.

Similar to the second exemplary embodiment, a third exemplary embodiment will be described while changing only the processing to be executed when the user presses the device icon. Because the processing executed in the present exemplary embodiment is similar to that described in the first exemplary embodiment except for the above change, only the processing to be executed when the user presses the device icon will be described in detail.

Figure 9:
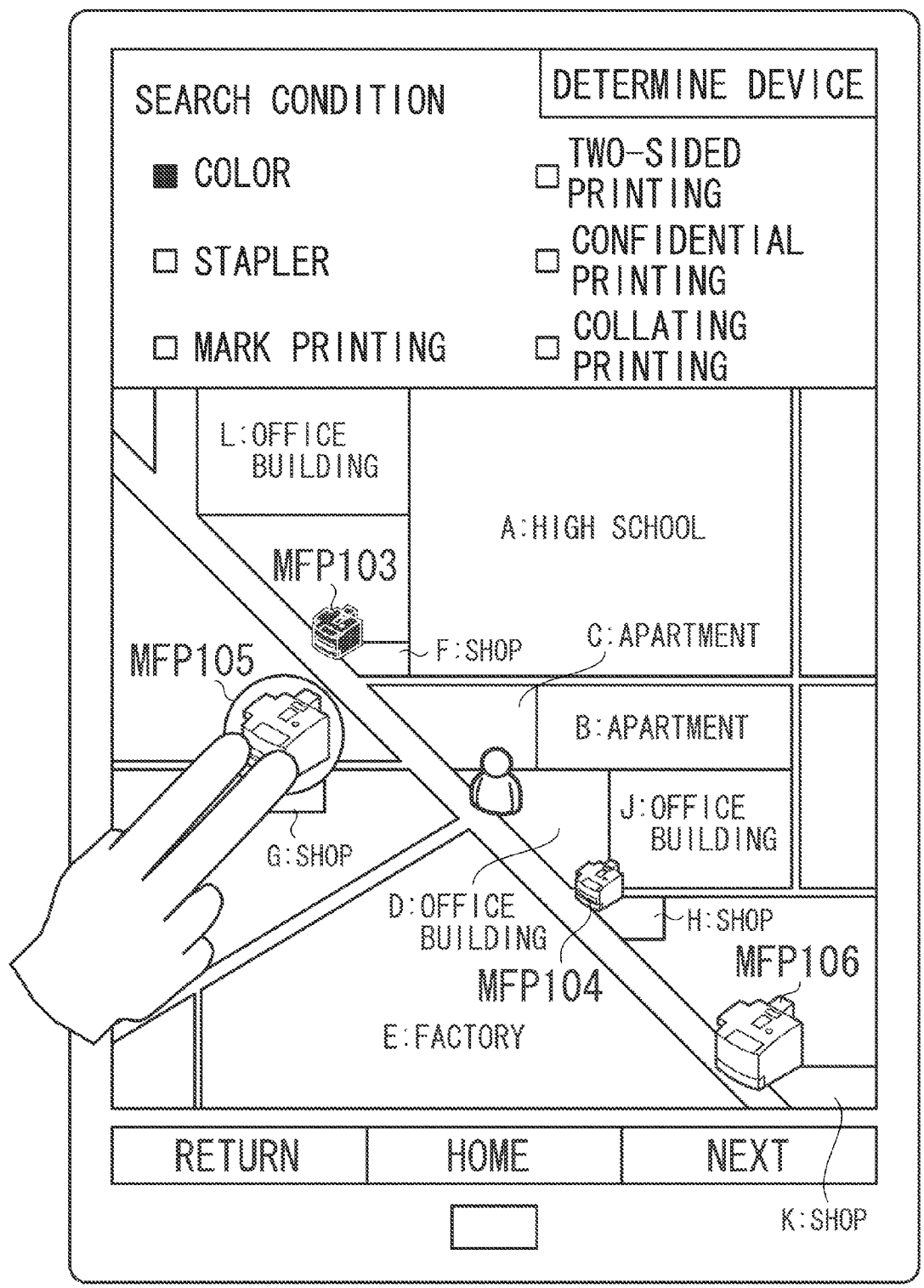
FIG. 9 illustrates an example of a device search screen displayed for a user, according to a third exemplary embodiment.

The processing that is to be executed when the device icon is pressed in the present exemplary embodiment will be described with reference to FIG. 9. Similar to the configuration in FIG. 8, a configuration of the screen illustrated in FIG. 9 includes a device determination button. Accordingly, a flow of the device determination processing is similar to that in the second exemplary embodiment, and thus the description thereof will be omitted.

In the present exemplary embodiment, when the control unit 204 of the client terminal 101 detects that the device icon is pressed, the control unit 204 causes the pressed device icon to enter into a selected state. For example, in FIG. 9, the device icon of the MFP 105 is enlarged and also surrounded by a circular frame in order to explicitly express that the device icon of the MFP 105 is pressed and in the selected state. However, the expression method thereof is not limited to the above.

Subsequently, the control unit 204 of the client terminal 101 acquires the function information of the device in a selected state. The control unit 204 of the client terminal 101 executes the above processing by referring to the above-described device management information sub-table or the device candidate table. In the example illustrated in FIG. 9, the MFP 105 is the selected state, and the control unit 204 of the client terminal 101 can identify that the MFP 105 includes the respective functions of "color", "stapler", and "two-sided printing (not illustrated)" by referring to the device candidate table in FIG. 4D.

Next, the control unit 204 of the client terminal 101 acquires the respective pieces of function information of the devices which are not selected but displayed in the device map information. The control unit 204 of the client terminal 101 executes the above processing by referring to the above-described device management information sub-table or the device candidate table. In the example illustrated in FIG. 9, the MFPs 104 and 106 correspond to the unselected devices, and thus the control unit 204 of the client terminal 101 acquires the respective pieces of function information thereof. By referring to the device candidate table in FIG. 4D, the control unit 204 of the client terminal 101 can identify that the MFP 104 only includes "color" as a function whereas the MFP 106 includes the respective functions of "color", "stapler", "mark printing", and "two-sided printing (not illustrated)".

Next, the control unit 204 of the client terminal 101 determines whether another device which includes at least the same functions as those of the device in the selected state exists in an area displayed in the device map information. This determination is made by cross-checking the function information of each device acquired in advance. For example, in the example illustrated in FIG. 9, the MFP 105 is in the selected state, and the MFP 105 includes the functions of "color", "stapler", and "two-sided printing". The control unit 204 of the client terminal 101 determines whether the functions included in the MFPs 104 and 106 are respectively equal to or more than the functions included in the MFP 105. Then, based on the above-described respective functions of the MFPs 104 and 106, the control unit 204 of the client terminal 101 determines that the MFP 106 is the corresponding device.

Next, in a case where the control unit 204 of the client terminal 101 determines that another corresponding device exists in an area displayed in the device map information, the control unit 204 updates the device search screen to display the device icon of the corresponding device in an enlarged manner. In FIG. 9, the MFP 106 is displayed in an enlarged manner. In a case where another device which includes at least the same functions as those of the device in the selected state does not exist in the area displayed in the device map information, the control unit 204 of the client terminal 101 does not execute the processing in particular.

As described above, in the present exemplary embodiment, in a case where the device icon is pressed, the device icon of another device which includes at least all the functions included in the device of the pressed device icon is displayed in an enlarged manner. Further, in the present exemplary embodiment, although the device icon of the corresponding device is displayed in an enlarged manner, a display method thereof is not limited thereto, and another display method such as displaying the device icon in a different color or displaying a mark may be employed as long as the corresponding device would be distinguishable.

With the above-described display method, the user can easily recognize the position of another device which includes the functions equal to or more than the functions included in the selected device, and thus the convenience of the user can be improved.

As described above, according to the above-described exemplary embodiments, map information which includes a device that satisfies the currently-set search condition and a device that satisfies the previously-set search condition can be displayed. With this configuration, the user can intuitively identify an installation site of the available MFP and recognize a change in devices that satisfy search conditions when the search conditions change, so that the user can save his/her time and effort required to determine the device to execute printing.

Furthermore, when the device icon displayed on the map is pressed, the functions included in the device of the pressed device icon are displayed, or a device that includes the same functions as those included in the device of the pressed device icon is displayed in an emphasized manner. Therefore, the user can intuitively recognize the device information, and thus the convenience of the user can be further improved.

In addition, in the above-described exemplary embodiments, the device management server 102 has been described as a device provided separately from the MFPs 103 to 108. However, any one of the MFPs 103 to 108 may include a function for serving as a device management server. Alternatively, the client terminal 101 itself may include a function for serving as a device management server.

Furthermore, in the above-described exemplary embodiments, an MFP or an SFP has been described as an example. However, the present invention is also applicable to devices other than such printing apparatuses, including an imaging apparatus such as an identification (ID) photograph imaging apparatus and a photo-sticker apparatus.

According to an exemplary embodiment of the present invention, the user can search for a desired printing apparatus while effectively utilizing a previously acquired search result.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-251388 filed Dec. 4, 2013, which is hereby incorporated by reference herein in its entirety.

What is claimed is:

1. An information processing apparatus comprising:
one or more processors; and
one or more computer-readable media storing instructions that, when executed by the one or more processors, cause the one or more processors to perform operations comprising:
setting a first search condition that specifies a function of one or more data processing apparatuses;
identifying a first data processing apparatus that satisfies the first search condition;
based on the first data processing apparatus satisfying the first search condition, displaying first information representing the first data processing apparatus on a map;
setting a second search condition that specifies a second function in addition to the first search condition while the first information representing the first data processing apparatus which satisfies the first search condition is displayed on the map;
determining that the first data processing apparatus does not satisfy the second search condition; and
displaying, according to the second search condition and the first search condition, information representing a second data processing apparatus which satisfies both the first search condition and the second search condition and second information representing the first data processing apparatus which satisfies the first search condition and does not satisfy the second search condition on the map in a distinguishable manner, the second information representing the first data processing apparatus being different from the first information representing the first data processing apparatus.

2. The information processing apparatus according to claim 1, the operations further comprising:
receiving information indicating a data processing apparatus is selected on a screen displayed by the information processing apparatus; and
displaying a setting screen for causing the selected data processing apparatus to execute data processing.

3. The information processing apparatus according to claim 1, the operations further comprising:
receiving information indicating a data processing apparatus is selected on a screen displayed by the information processing apparatus; and
among functions included in the selected data processing apparatus, displaying in a distinguishable manner a function corresponding to a settable search condition.

4. The information processing apparatus according to claim 1, the operations further comprising:
receiving information indicating a data processing apparatus is selected on a screen displayed by the information processing apparatus; and
displaying in a distinguishable manner another data processing apparatus which includes, among functions included in the selected data processing apparatus, at least functions corresponding to settable search conditions.

5. The information processing apparatus according to claim 1, the operations further comprising:
displaying information representing a data processing apparatus that exists in an area within a predetermined distance from the information processing apparatus.

6. The information processing apparatus according to claim 1, the operations further comprising:
excluding from a display target a data processing apparatus which is not in a state of being able to immediately execute data processing, according to a status of each of the data processing apparatuses.

7. The information processing apparatus according to claim 1, the operations further comprising:
changing a scale of the map so that a number of data processing apparatuses displayed on the map is a predetermined number.

8. The information processing apparatus according to claim 1, wherein the data processing apparatus is a printing apparatus.

9. A method for controlling an information processing apparatus, the method comprising:
setting a first search condition that specifies a function of one or more data processing apparatuses;
identifying a first data processing apparatus that satisfies the first search condition;
based on the first data processing apparatus satisfying the first search condition, displaying first information representing the first data processing apparatus on a map;
setting a second search condition that specifies a second function in addition to the first search condition while the first information representing the first data processing apparatus which satisfies the first search condition is displayed on the map;
determining that the first data processing apparatus does not satisfy the second search condition; and
displaying, according to the second search condition and the first search condition, information representing a second data processing apparatus which satisfies both the first search condition and the second search condition and second information representing the first data processing apparatus which satisfies the first search condition and does not satisfy the second search condition on the map in a distinguishable manner, the second information representing the first data processing apparatus different from the first information representing the first data processing apparatus.

10. A non-transitory computer-readable storage medium storing a computer program for causing a computer to execute a method comprising:
setting a first search condition that specifies a function of one or more data processing apparatuses;
identifying a first data processing apparatus that satisfies the first search condition;
based on the first data processing apparatus satisfying the first search condition, displaying first information representing the first data processing apparatus on a map;
setting a second search condition that specifies a second function in addition to the first search condition while the first information representing the first data processing apparatus which satisfies the first search condition is displayed on the map;
determining that the first data processing apparatus does not satisfy the second search condition; and displaying, according to the second search condition and the first search condition, information representing a second data processing apparatus which satisfies both the first search condition and the second search condition and second information representing the first data processing apparatus which satisfies the first search condition and does not satisfy the second search condition on the map in a distinguishable manner, the second information representing the first data processing apparatus different from the first information representing the first data processing apparatus.

11. The information processing apparatus according to claim 1, wherein the displaying the information representing the second data processing apparatus which satisfies both the first search condition and the second search condition and the second information representing the first data processing apparatus which satisfies the first search condition and does not satisfy the second search condition on the map in a distinguishable manner comprises displaying the information representing the second data processing apparatuses and the second information representing the first data processing apparatus as being different in color or size from each other.

12. The information processing apparatus according to claim 1, the operations further comprising:
   transmitting position information indicating a position of the information processing apparatus to a management server that manages a plurality of data processing apparatuses; and
   receiving from the management server information regarding a data processing apparatus that exists within a predetermined distance from the information processing apparatus,
   wherein the displaying the first information representing the first data processing apparatus on the map is performed based on the first search condition and based on the information regarding the data processing apparatus received from the management server.

* * * * *